(12) United States Patent
Huang et al.

(10) Patent No.: US 10,687,650 B2
(45) Date of Patent: Jun. 23, 2020

(54) ELECTRIC PRESSURE COOKER HAVING SAFETY SWITCH DEVICE

(71) Applicant: Guangdong Shunde Ouning Technology Electrical Appliance Co., Ltd., Foshan (CN)

(72) Inventors: Zhen xiong Huang, Foshan (CN); Ziyu Li, Foshan (CN); Jiufu Tan, Foshan (CN); Hualiang Li, Foshan (CN)

(73) Assignee: Guangdong Shunde Ouning Technology Electrical Appliance Co., Ltd., Guangdong (CN)

( * ) Notice: Subject to any disclaimer, the term of this patent is extended or adjusted under 35 U.S.C. 154(b) by 284 days.

(21) Appl. No.: 15/782,999

(22) Filed: Oct. 13, 2017

(65) Prior Publication Data
US 2018/0110355 A1 Apr. 26, 2018

(30) Foreign Application Priority Data
Oct. 25, 2016 (CN) ..................... 2016 2 1157341 U

(51) Int. Cl.
*A47J 27/09* (2006.01)
(52) U.S. Cl.
CPC .................................. *A47J 27/09* (2013.01)

(58) Field of Classification Search
CPC ...... A47J 27/08; A47J 27/0802; A47J 27/086; A47J 27/09; A47J 27/0804; A47J 27/092
See application file for complete search history.

(56) References Cited

U.S. PATENT DOCUMENTS

2016/0135636 A1\* 5/2016 Song ..................... A47J 36/06
219/431

\* cited by examiner

*Primary Examiner* — Shawntina T Fuqua
(74) *Attorney, Agent, or Firm* — JCIP Global Inc.

(57) ABSTRACT

An electric pressure cooker having a safety switch device. The electric pressure cooker includes a cooker body and a lid; wherein the cooker body is provided with a push rod vertically reciprocating relative to the cooker body; the cooker body is further provided with a microswitch; a driving rod of the microswitch horizontally reciprocates relative to the cooker body; after the push rod moves downward, the driving rod of the microswitch is pushed to trigger the microswitch by the push rod; after the push rod moves upward, the driving rod of the microswitch is detached from the push rod; an upper end of the push rod abuts against the lid and the push rod moves upward and downward with rotation of the lid to detach from and push the push rod of the microswitch; and the microswitch is electrically connected to a circuitry of the electric pressure cooker.

7 Claims, 15 Drawing Sheets

ELECTRIC PRESSURE COOKER HAVING SAFETY SWITCH DEVICE

TECHNICAL FIELD

The present invention relates to the technical field of pressure cookers, and in particular, relates to an electric pressure cooker having a safety switch device.

BACKGROUND

Electric pressure cookers heats by using an electric heating tray. The heating tray, pressure switch and the like are intelligently monitored by using a micro control unit. This heating manner is highly efficient and energy saving, and is safe and reliable in terms of operation. The market reveals that the electric pressure cookers have been gradually replacing the traditional pressure cookers. The electric pressure cooker is a product upgraded from the optimization and combination of the pressure cooker and the electric rice cooker, which embodies the advantages of both the pressure cooker and the electric rice cooker. The electric pressure cooker is capable of heating by using electric energy in a sealed state within the cooker, and is environmentally friendly and quick and convenient, which thus accommodates cooking needs in various aspects.

Similar to the traditional pressure cooker, when the lid of the electric pressure cooker is not in place to be properly engaged with the cooker body, the risks of lid opening may be present. The conventional lid or cooker body is provided with a reed switch or a magnetic switch or other detection devices, and a magnet is arranged at a corresponding position on the cooker body or the lid. In this way, the electric pressure cooker starts heating only when the lid is in place to be properly engaged with the cooker body.

However, configuration of such detection device may increase the cost of the electric pressure cooker. In addition, the electric pressure cooker is incapable of heating when the lid is opened, that is, the electric pressure cooker fails to heat when the lid is detached from the cooker body. Consequently, diversified usage needs of the users may not be accommodated.

SUMMARY

To overcome the defect in the prior art, the present invention provides an electric pressure cooker having a safety switch device which is capable of preventing lid-pushing caused dangers.

The present invention achieves the above objective by using the following technical solution.

An electric pressure cooker having a safety switch apparatus comprises a cooker body and a lid, the lid being rotatably engaged with the cooker body; wherein the cooker body is provided with a push rod vertically reciprocating relative to the cooker body, and the cooker body is further provided with a microswitch; wherein a driving rod of the microswitch horizontally reciprocates relative to the cooker body; after the push rod moves downward, the driving rod of the microswitch is pushed to trigger the microswitch by the push rod; after the push rod moves upward, the driving rod of the microswitch is detached from the push rod and the driving rod of the microswitch is automatically reset; an upper end of the push rod abuts against the lid and the push rod moves upward and downward with rotation of the lid to detach from and push the driving rod of the microswitch; and the microswitch is electrically connected to a circuitry of the electric pressure cooker.

In this technical solution, the microswitch may be a normally-opened microswitch, or may also be a normally-closed microswitch. When the normally-closed microswitch is employed, it may be connected in series to a main power circuit of the circuitry, or may be connected to a control circuit of the circuitry as a signal switch; and then the electric pressure cooker is controlled via the control circuit, such that the electric pressure cooker cannot heat when the normally-closed microswitch is triggered and can heat when the normally-closed microswitch is not triggered. When the normally-opened microswitch is employed, it should be connected to the control circuit of the circuitry as a signal switch; and then the electric pressure cooker is controlled by means of signal conversion via the control circuit, such that the electric pressure cooker cannot heat when the normally-opened microswitch is triggered and can heat when the normally-opened microswitch is not triggered. In this way, the latent safety risks of lid opening that the electric pressure cooker can heat when the lid is not in place to be properly engaged with the cooker body are eliminated, and safety of the electric pressure cooker is improved. In addition, the electric pressure cooker is still capable of heating even when the lid is detached from the cooker body, which overcomes the defect that the conventional electric pressure cooker only heats when the cooker body is covered with the lid.

The microswitch is a normally-closed microswitch for ease of design and connection of the circuitry.

The push rod comprises a plate-shaped body; the plate-shaped body upward and downward slidingly cooperates with the cooker body; one side of the plate-shaped body is provided with a horizontal plate perpendicular to a side face of the plate-shaped body; a suspension arm whose central line is parallel to the side face of the plate-shaped body is downward provided on the horizontal plate, a lower end of the suspension arm is provided with a bevel face for driving the driving rod of the microswitch; the horizontal plate is further provided with a via hole; the cooker body is provided with a slide rod; the via hole in the horizontal plate is sleeved onto an outer side of the slide rod such that the push rod slidingly cooperates with the slide rod; a compression spring is sleeved onto the outer side of the slide rod; an upper end of the compression spring abuts against a lower face of the horizontal plate; and a lower end of the compression spring abuts against the cooker body. In this structure, the plate-shaped body of the push rod slidingly cooperates with the cooker body, and the via hole of the push rod slidingly cooperates with the slide rod on the cooker body, which prevents slide jamming due to non-uniform stress onto the push rod, and ensures smooth sliding and stable operation. The bevel face at the lower end of the suspension arm enables the driving rod of the microswitch to gradually move, which prevents quick shock and damages caused to the driving rod.

The lid is provided with a push block; when the lid is rotated and engaged with the cooker body but is not in place to be properly engaged with the cooker body, the push block pushes the push rod to move downward; and when the lid is rotated and in place to be properly engaged with the cooker body, the push block is detached from the push rod and the push rod moves upward under a resilience force of the compression spring.

An upper end of the plate-shaped body of the push rod is arch-shaped or sharp, and when the lid is rotated, the push block gradually pushes the push rod, which prevents the push rod from directly causing a shock to the push rod and causing damages to the push rod.

The cooker body comprises a housing, a middle ring and an outer cooker, wherein the outer cooker is arranged in the housing; the middle ring is connected to an upper end of the housing; the slide rod is arranged on the middle ring; the push rod upward and downward slidingly cooperates with the middle ring and is not detached from the middle ring; the microswitch is mounted on the middle ring, and the microswitch is arranged between the outer cooker and the housing, which facilitates circuit connection of the microswitch and ensures integral beauty of the electric pressure cooker.

When the push rod moves upward and downward, an upper end of the plate-shaped body is always partially exposed from the middle ring, which facilitates observation from the user for the push rod.

As compared with the prior art, the present invention achieves the following beneficial effects:

In this way, the latent safety risks of lid opening that the electric pressure cooker can heat when the lid is not in place to be properly engaged with the cooker body are eliminate, and safety of the electric pressure cooker is improved. In addition, the electric pressure cooker is still capable of heating even when the lid is detached from the cooker body, which overcomes the defect that the conventional electric pressure cooker only heats when the cooker body is covered with the lid. In conclusion, the electric pressure cooker is simple in structure, stable in operation and low in cost.

DETAILED DESCRIPTION

The present invention is further described with reference to the accompanying drawings. The accompanying drawings are only for exemplary description, and shall not be construed as limiting the patent.

For brief description of the embodiment, parts or elements illustrated in the accompanying drawings and specification that are irrelevant to the inventive content of the present invention but are commonly known by a person skilled in the art may not be described herein. In addition, for ease of description, some parts or elements in the accompanying drawings may be omitted, scaled up or scaled down, which however do not represent the practical dimensions or all the structures of the product.

Embodiment

Figure 1:
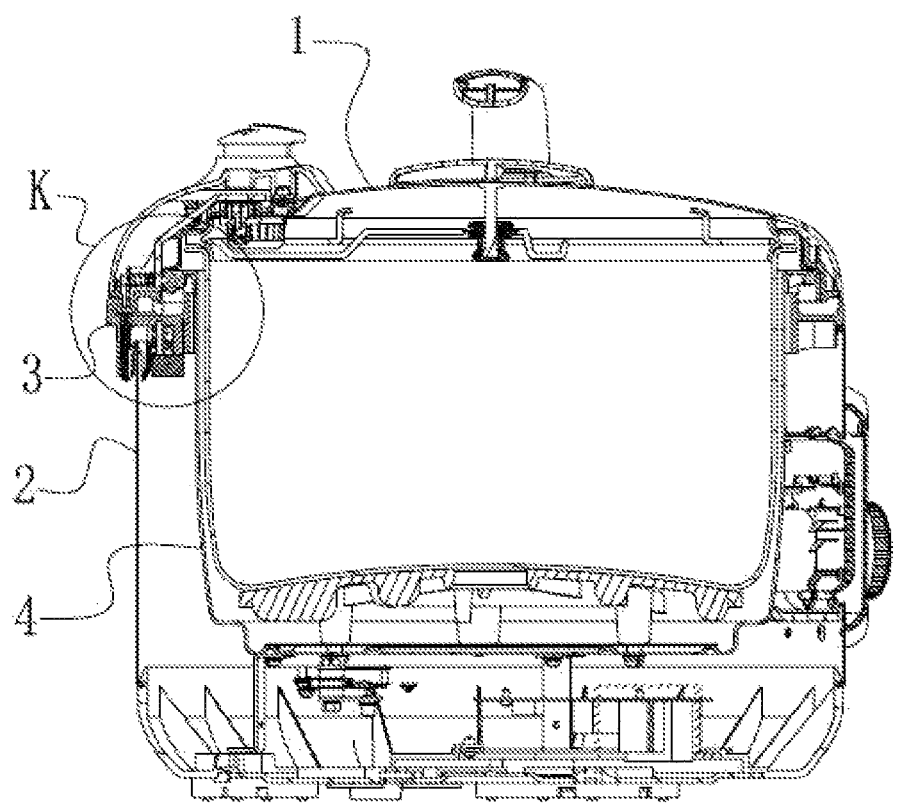
FIG. 1 is a schematic sectional structural view according to an embodiment of the present invention.

As illustrated in FIG. 1, an electric pressure cooker having a safety switch device comprises a cooker body and a lid 1, wherein the lid 1 is rotatably engaged with the cooker body. The cooker body comprises a housing 2, a middle ring 3 and an outer cooker 4, wherein the outer cooker 4 is arranged in the housing 2, and the middle ring 3 is connected to an upper end of the housing 2. The main structure of the electric pressure cooker in this embodiment is substantially the same as the structure of a conventional electric pressure cooker.

Figure 2:
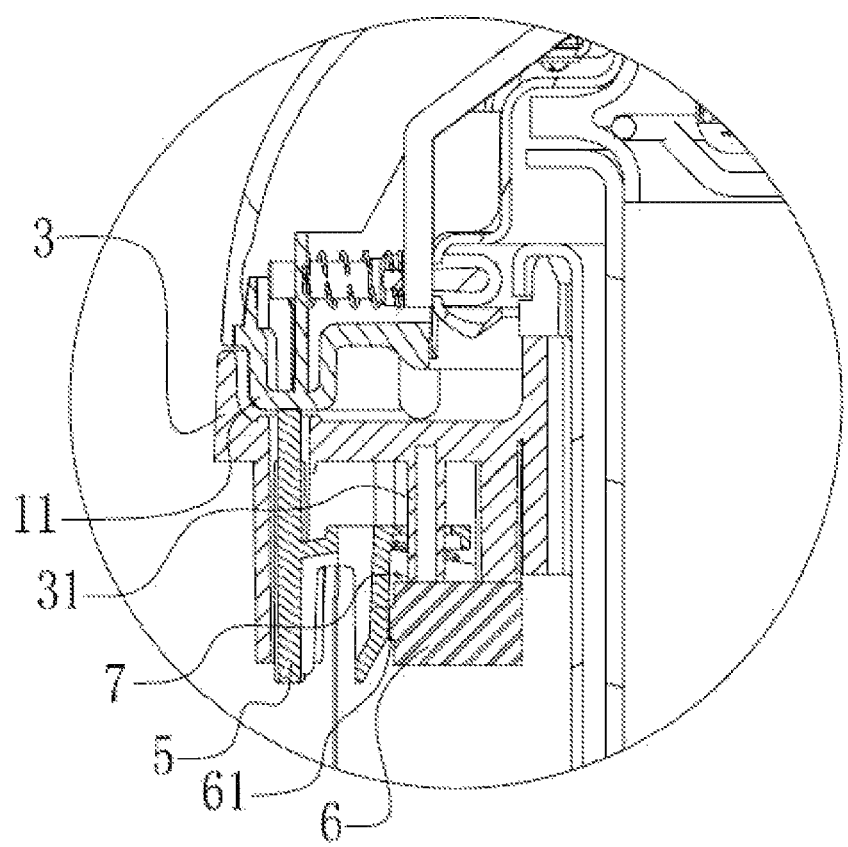
FIG. 2 is an enlarged schematic structural view of K position shown in FIG. 1.

As illustrated in FIG. 2, the middle ring 3 is provided with a push rod 5 vertically reciprocating relative to the middle ring 3; the push rod 5 slidingly cooperates with the middle ring 3 but is not detached from the middle ring 3; the middle ring 3 is provided with a normally-closed microswitch 6; a driving rod 61 of the microswitch 6 horizontally reciprocates relative to the cooker body; after the push rod 5 moves downward, the driving rod 61 of the microswitch 6 is pushed to trigger the microswitch 6 by the push rod 5; after the push rod 5 moves upward, the driving rod 61 of the microswitch 6 is detached from the push rod 5 and the driving rod 61 of the microswitch 6 is automatically reset. The microswitch 6 is connected in series to a main power circuit of a circuitry of the electric pressure cooker.

Figure 3:
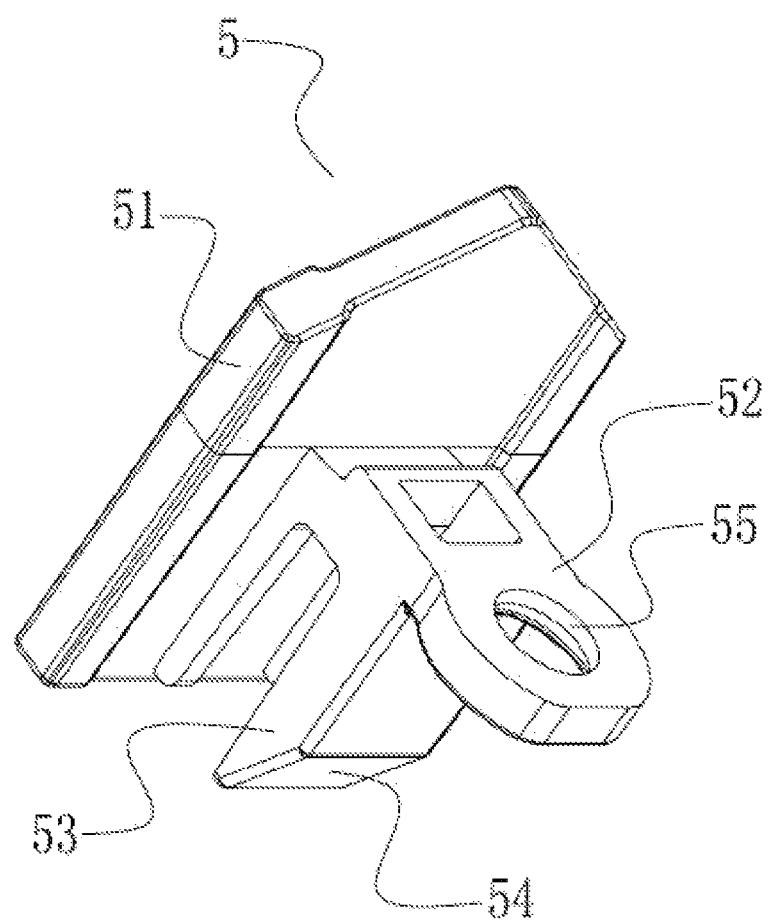
FIG. 3 is a schematic perspective structural view of a push rod according to an embodiment of the present invention.

As illustrated in FIG. 2 and FIG. 3, the push rod 5 comprises a plate-shaped body 51, wherein the plate-shaped body 51 upward and downward slidingly cooperates with the middle ring 3; one side of the plate-shaped body 51 is provided with a horizontal plate 52 perpendicular to a side face of the plate-shaped body 51; a suspension arm 53 whose central line is parallel to the side face of the plate-shaped body 51 is downward provided on the horizontal plate 52, a lower end of the suspension arm 53 is provided with a bevel face 54 for driving the driving rod 61 of the microswitch 6; the horizontal plate 52 is further provided with a via hole 55; the middle ring 3 is provided with a slide rod 31; the via hole 55 in the horizontal plate 52 is sleeved onto an outer side of the slide rod 31 such that the push rod 5 slidingly cooperates with the slide rod 31; a compression spring 7 is sleeved onto the outer side of the slide rod 31; an upper end of the compression spring 7 abuts against a lower face of the horizontal plate 52, a lower end of the compression spring 7 abuts against the middle ring 3. Herein a horizontal flange may be arranged on the middle ring to support the lower end of the compression spring 7 to supply a support force to the compression spring 7.

The lid 1 is provided with a push block 11, wherein when the lid 1 is engaged with the cooker body but is not rotated in place, the push block 11 pushes the push rod 5 to move downward; and when the lid 1 is engaged with the cooker body and rotated in place, the push block 11 is detached from the push rod 5 and the push rod 5 moves upward under a resilience force of the compression spring 7.

In this embodiment, the normally-closed microswitch 6 is employed for ease of design and connection of the circuitry.

In this embodiment, the plate-shaped body 51 of the push rod 5 slidingly cooperates with the middle ring 3, and the via hole 55 of the push rod 5 slidingly cooperates with the slide rod 31 on the middle ring 3, which prevents slide jamming due to non-uniform stress onto the push rod 5, and ensures smooth sliding and stable operation. The bevel face 54 at the lower end of the suspension arm 53 enables the driving rod 61 of the microswitch 6 to gradually move, which prevents quick shock and damages caused to the driving rod.

Still referring to FIG. 3, an upper end of the plate-shaped body 51 of the push rod 5 in this embodiment is arch-shaped or sharp, and when the lid 1 is rotated, the push block 11 gradually pushes the push rod 5, which prevents the push rod 11 from directly causing a shock to the push rod 5 and causing damages to the push rod 5.

Still referring to FIG. 1, the microswitch 6 in this embodiment is arranged between the outer cooker 4 and the housing 2, which facilitates circuit connection of the microswitch 6 and ensures integral beauty of the electric pressure cooker.

When the push rod 5 in this embodiment moves upward and downward, an upper end of the plate-shaped body 51 is always partially exposed from the middle ring 3, which facilitates observation from the user for the push rod 5.

In this embodiment, the normally-opened microswitch is connected in series to the main power circuit of the circuitry of the electric pressure cooker, and then the electric pressure cooker can be controlled such that the electric pressure cooker do not heat when the lid 1 is not rotated in place and heats when the lid 1 is rotated in place. In this way, the latent safety risks of lid 1 opening that the electric pressure cooker can heat when the lid is not rotated in place are eliminate, and safety of the electric pressure cooker is improved. In addition, the electric pressure cooker is still capable of heating even when the lid 1 is detached from the cooker body, which overcomes the defect that the conventional electric pressure cooker only heats when the cooker body is covered with the lid 1.

The states of the microswitch 6 during the course where the lid 1 is detached from the cooker body and the lid 1 is engaged with the cooker body and rotated in place are described hereinafter in detail, one by one.

Figure 4:
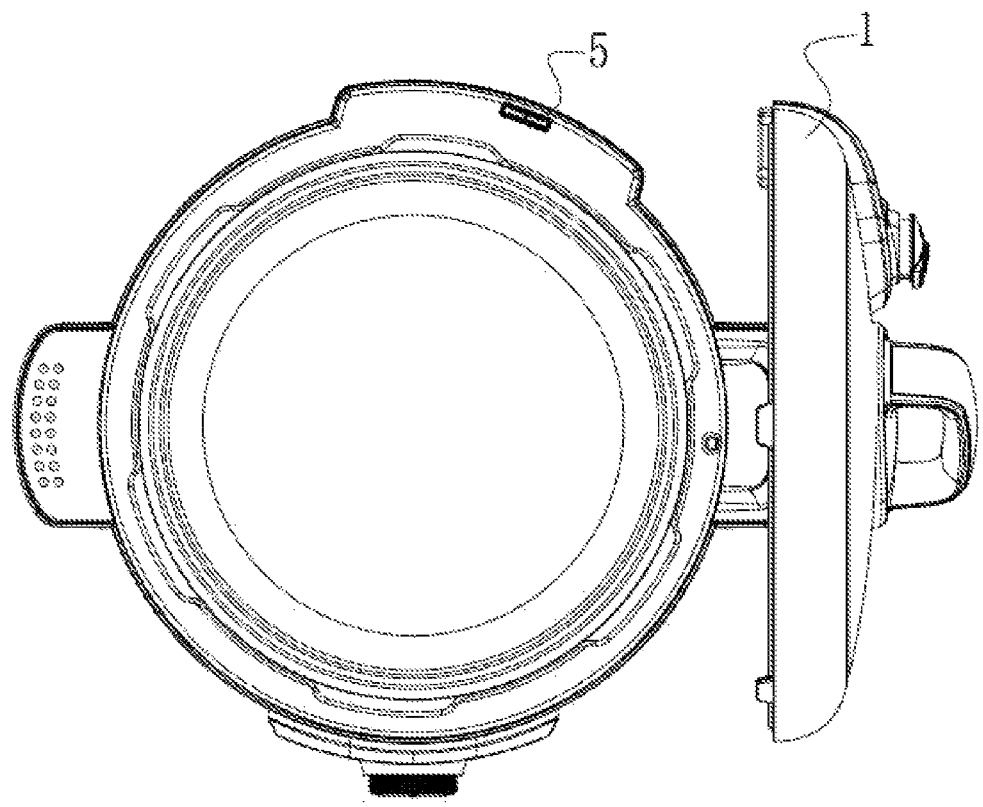
FIG. 4 is a schematic top structural view of the electric pressure cooker in a lid-opening state according to an embodiment of the present invention.
Figure 5:
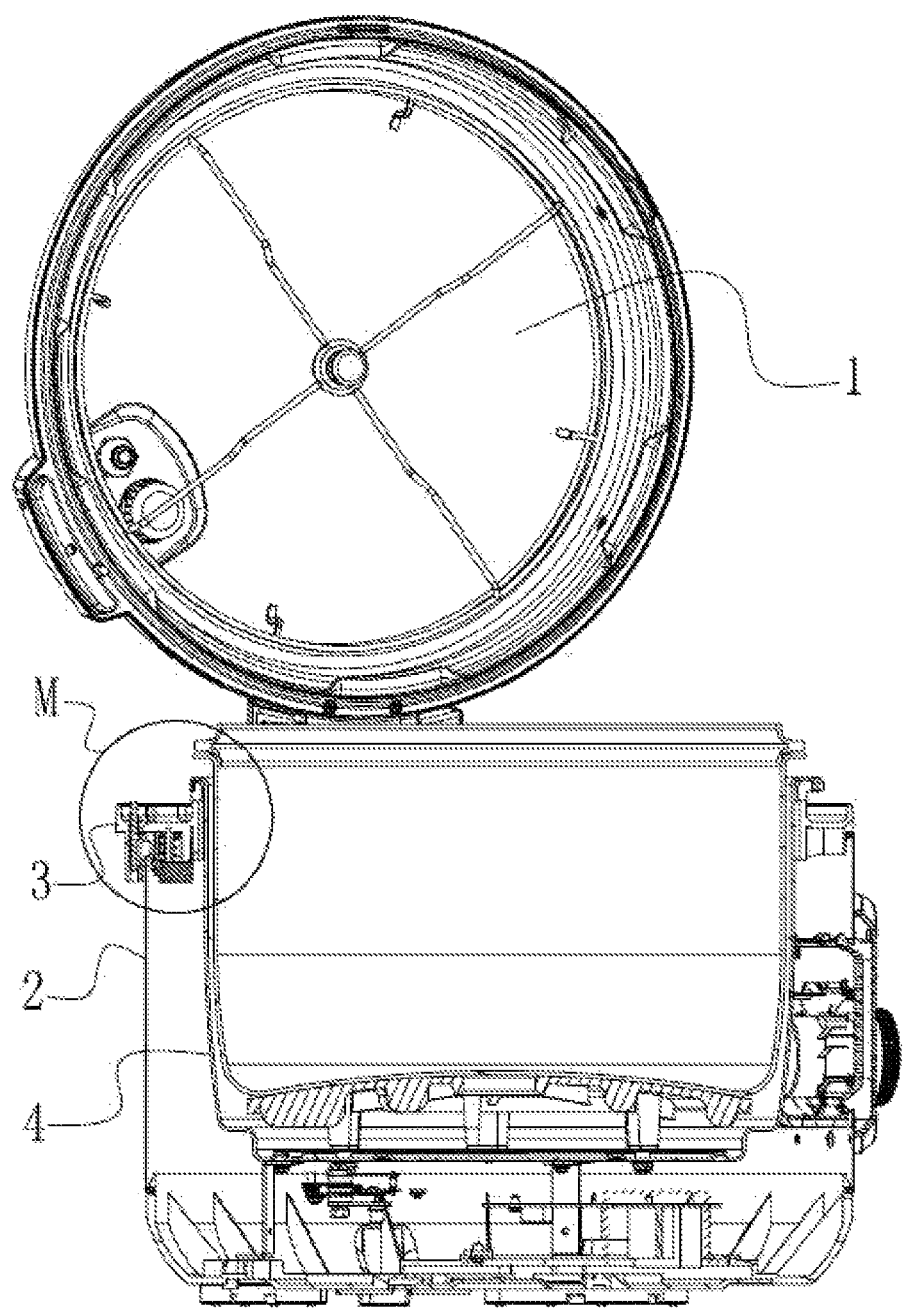
FIG. 5 is a schematic partial sectional structural view of the electric pressure cooker in the lid-opening state according to an embodiment of the present invention.
Figure 6:
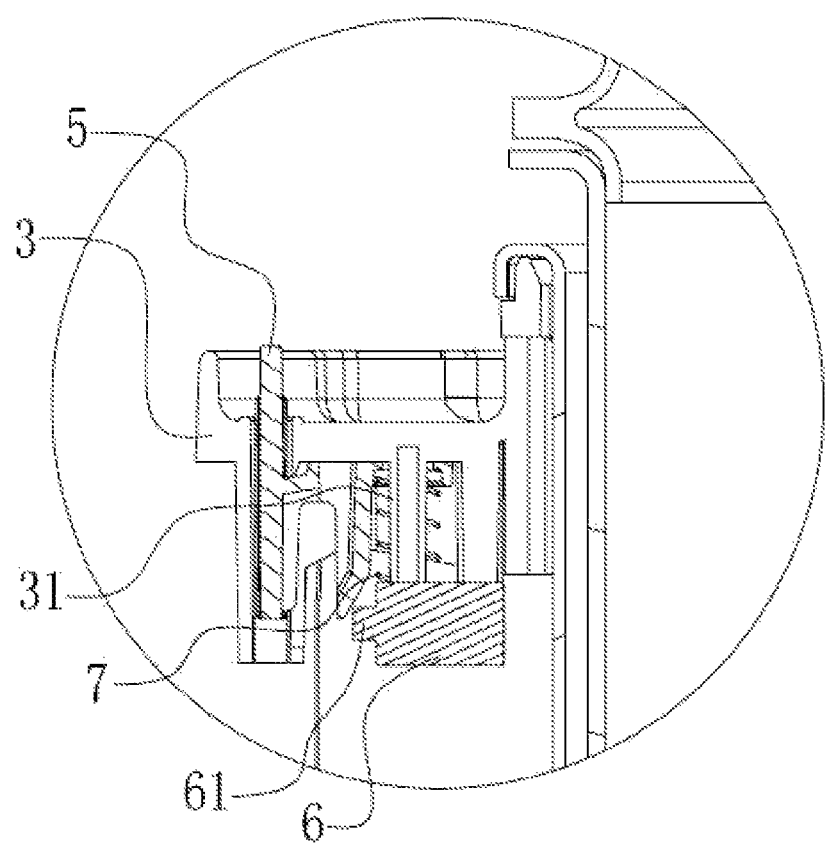
FIG. 6 is an enlarged schematic structural view of M position shown in FIG. 5.

As illustrated in FIG. 4, FIG. 5 and FIG. 6, when the lid 1 is detached from the cooker body, the push rod 5 retains in an upper limit position under the effect of the resilience force of the compression spring 7; the suspension arm 53 of the push rod 5 is detached from the driving rod 61 of the microswitch 6; the driving rod 61 of the microswitch 6 is automatically reset, and the microswitch 6 retains in a closing state. In this case, the electric pressure cooker is capable of heating, which overcomes the defect that the conventional electric pressure cooker only heats when cooker body is covered with the lid 1.

Figure 7:
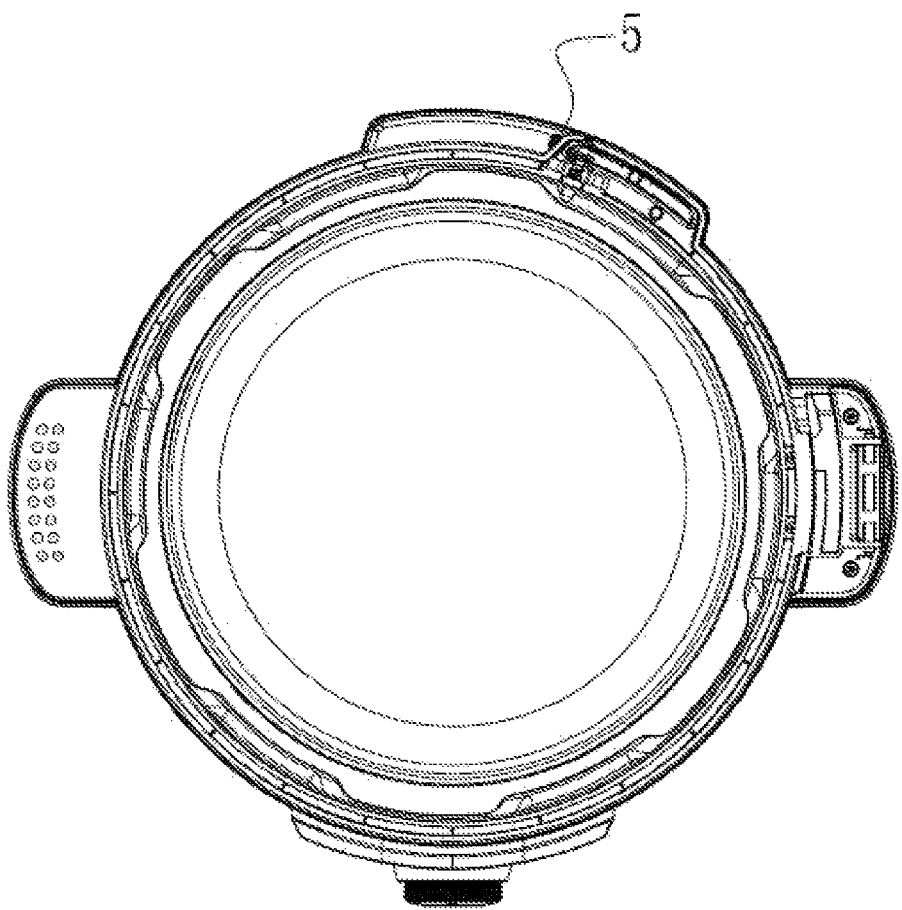
FIG. 7 is a schematic sectional structural view taken from a top angle when a lid is engaged with a cooker body but is not rotated according to an embodiment of the present invention.
Figure 8:
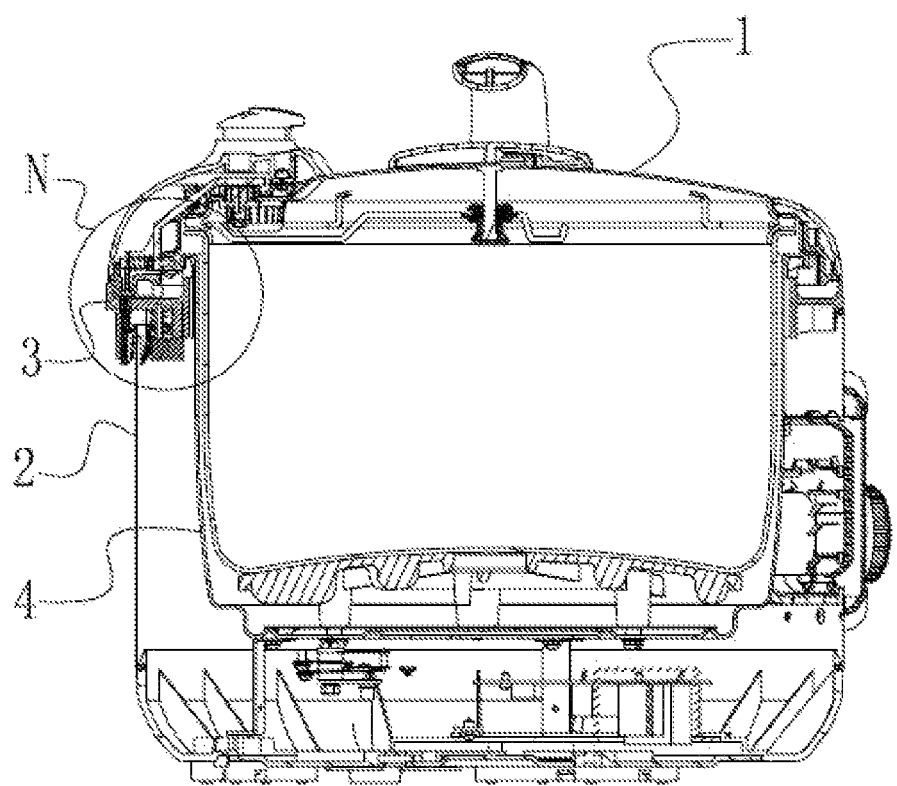
FIG. 8 is a schematic sectional structural view when the lid is engaged with the cooker body but is not rotated according to an embodiment of the present invention.
Figure 9:
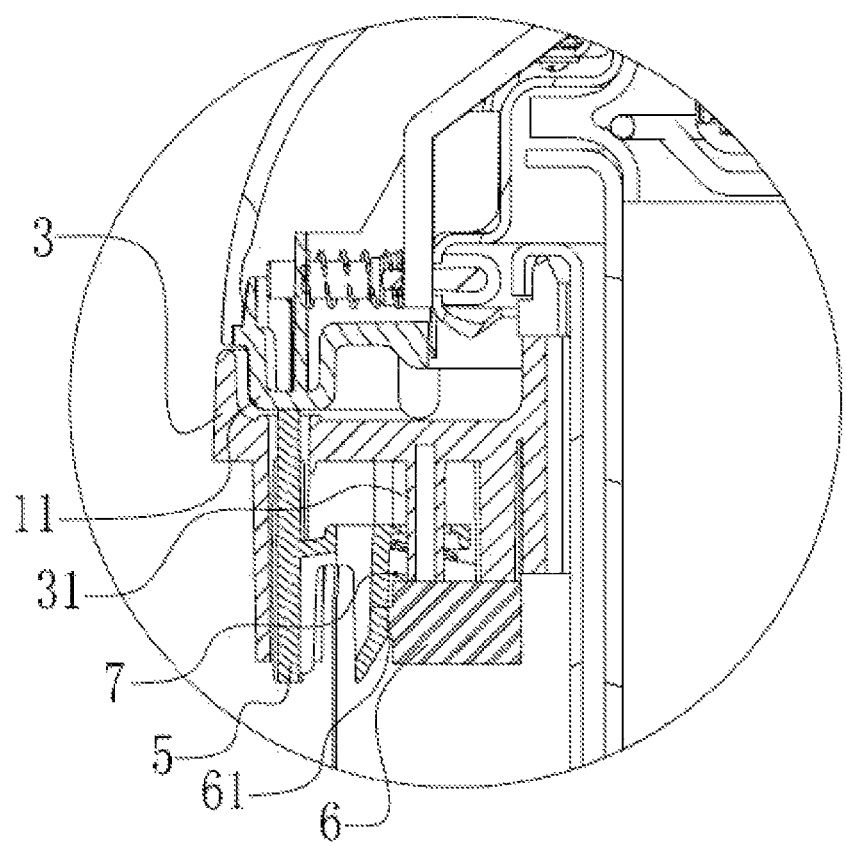
FIG. 9 is an enlarged schematic structural view of N position in FIG. 8.

As illustrated in FIG. 7, FIG. 8 and FIG. 9, when the lid 1 is engaged with the cooker but the lid is not rotated, the push block 11 on the lid 1 presses the push rod 5; the push rod 5 overcomes the resilience force of the compression spring 7 and moves to a lower limit position, and the suspension arm 53 of the push rod 5 drives the driving rod 61 of the microswitch 6 such that the microswitch 6 retains in an opening state. In this case, the electric pressure cooker is incapable of heating.

Figure 10:
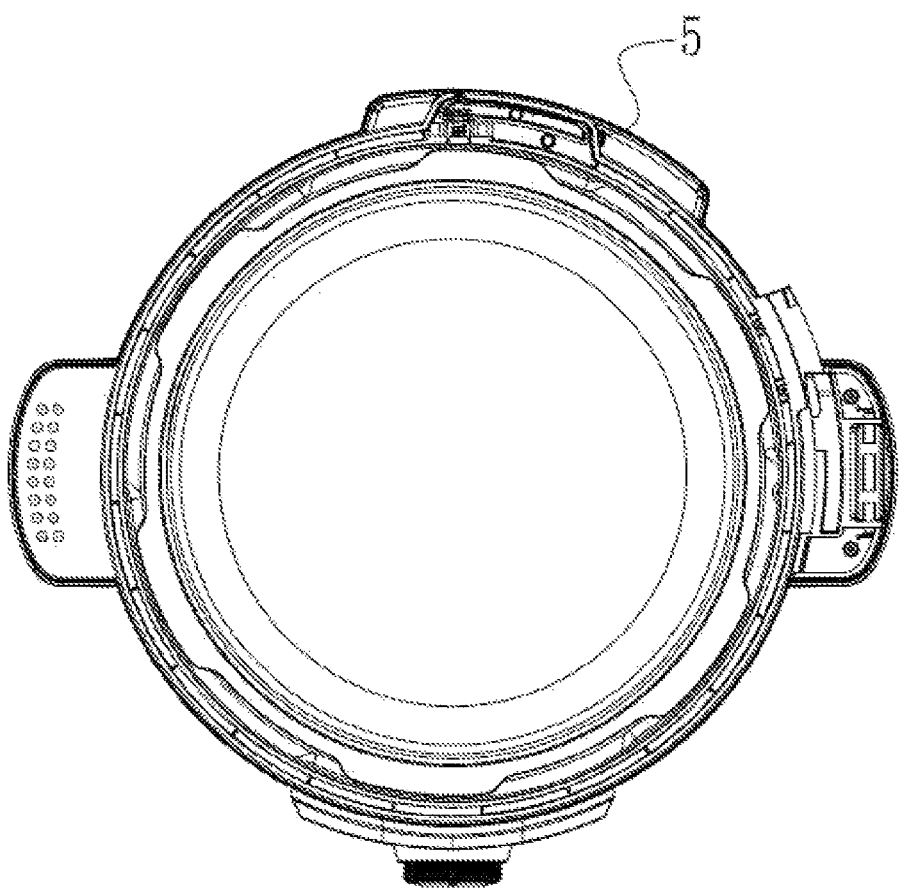
FIG. 10 is a schematic sectional structural view taken from a top angle when the lid is engaged with the cooker body but is not rotated in place according to an embodiment of the present invention.
Figure 11:
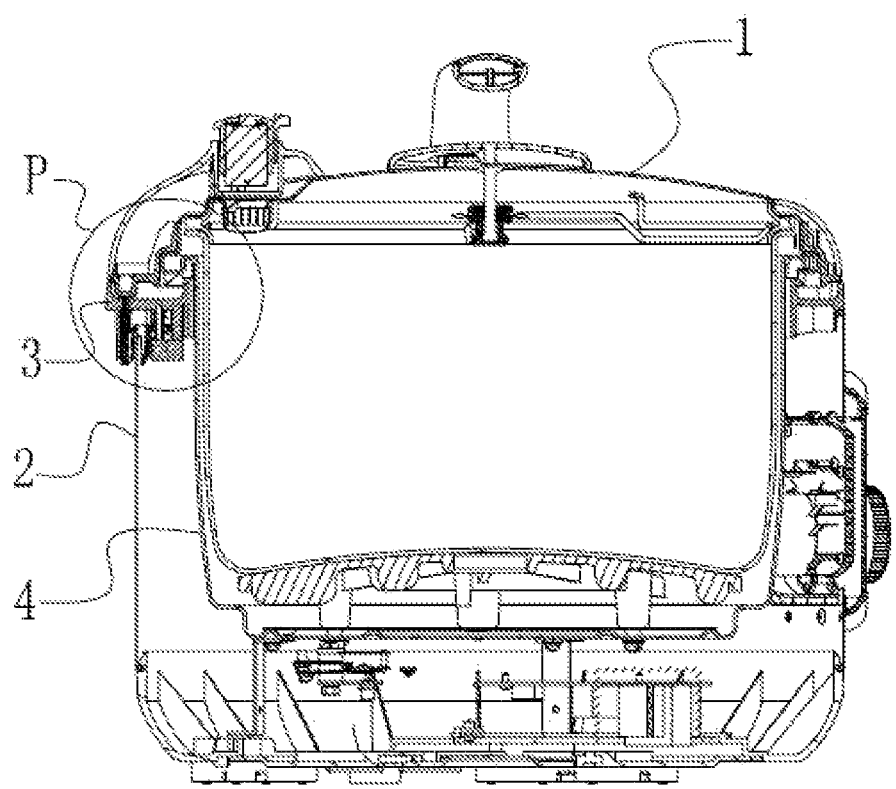
FIG. 11 is a schematic sectional structural view when the lid is engaged with the cooker body but is not rotated in place according to an embodiment of the present invention.
Figure 12:
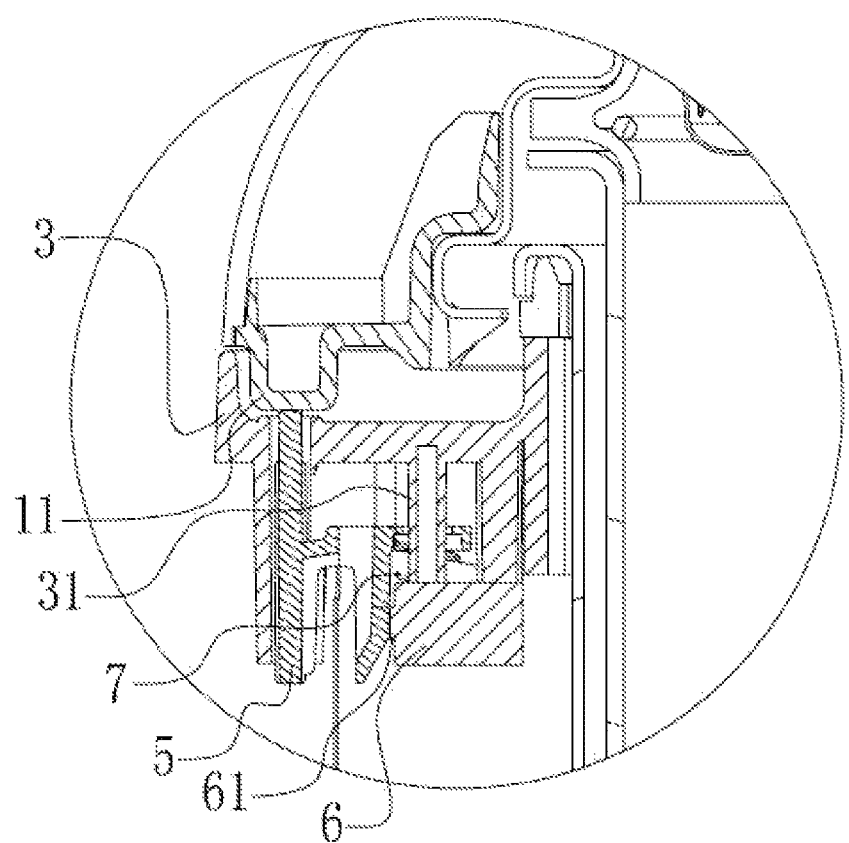
FIG. 12 is an enlarged schematic structural view of P position in FIG. 11.

As illustrated in FIG. 10, FIG. 11 and FIG. 12, when the lid 1 is engaged with the cooker body but the lid 1 is not rotated in place, the push block 11 on the lid 1 still presses the push rod 5; the push rod 5 overcomes the resilience force of the compression spring 7 and retains in the lower limit position; and the suspension arm 53 of the push rod 5 abuts against the driving rod 61 of the microswitch 6 such that the microswitch still retains in the opening state. In this case, the electric pressure cooker is incapable of heating, which eliminates the latent safety risks of lid opening that the electric pressure cooker can heat when the lid 1 is not rotated in place, and ensures usage safety of the user.

Figure 13:
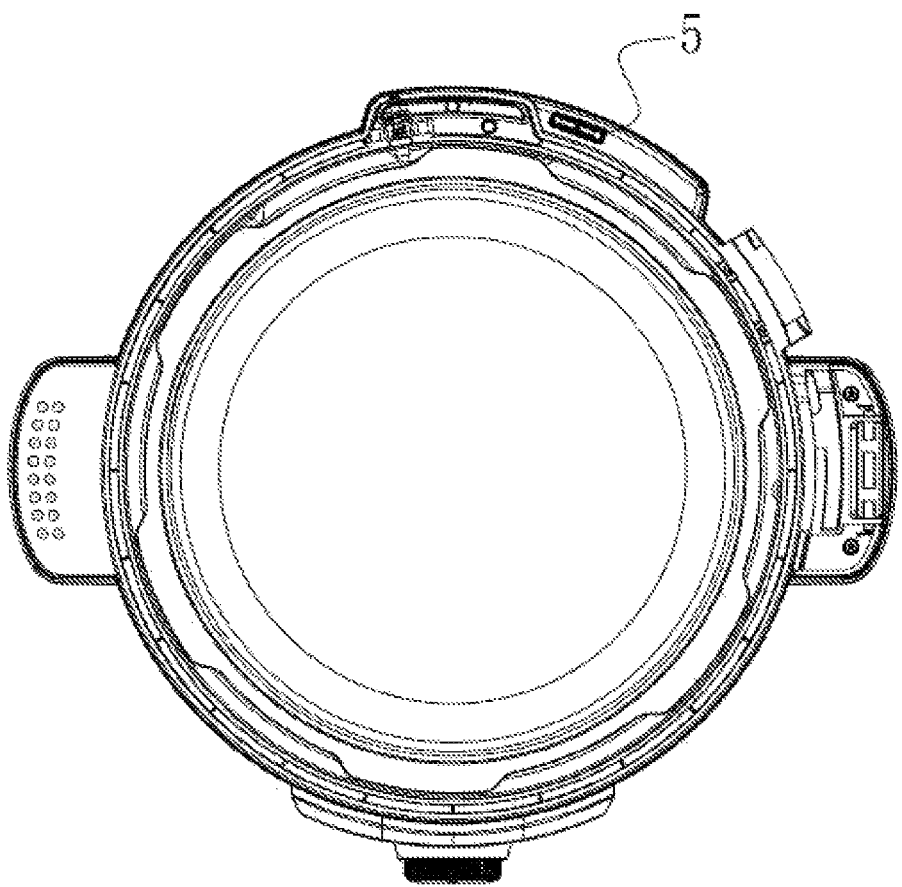
FIG. 13 is a schematic sectional structural view taken from a top angle when the lid is engaged with the cooker body but is rotated in place according to an embodiment of the present invention.
Figure 14:
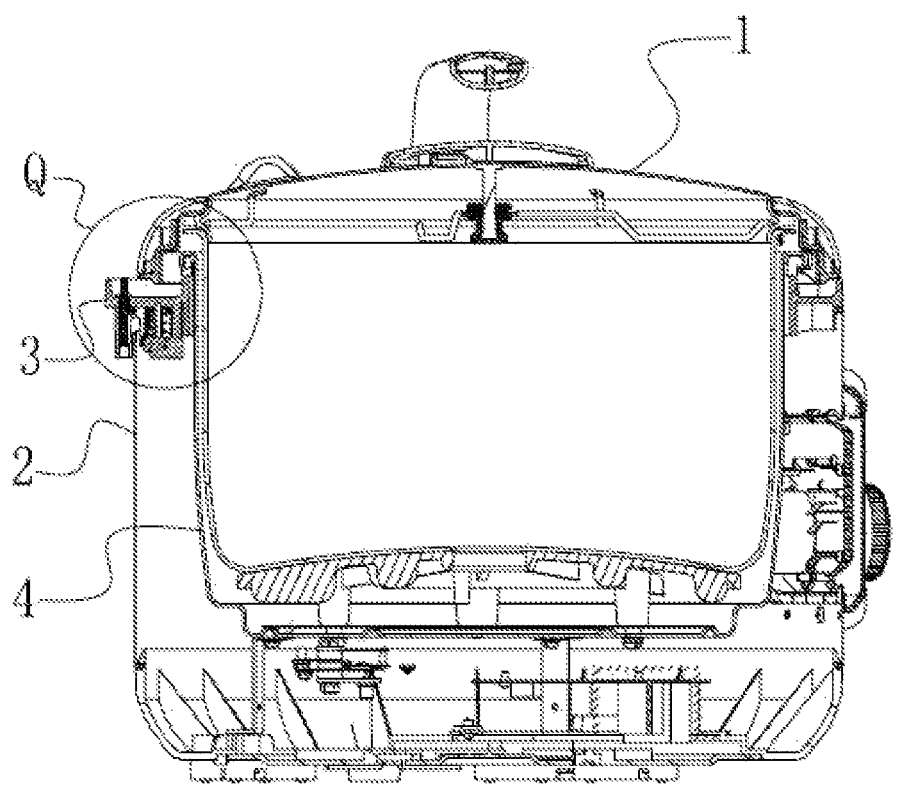
FIG. 14 is a schematic sectional structural view when the lid is engaged with the cooker body but is rotated in place according to an embodiment of the present invention.
Figure 15:
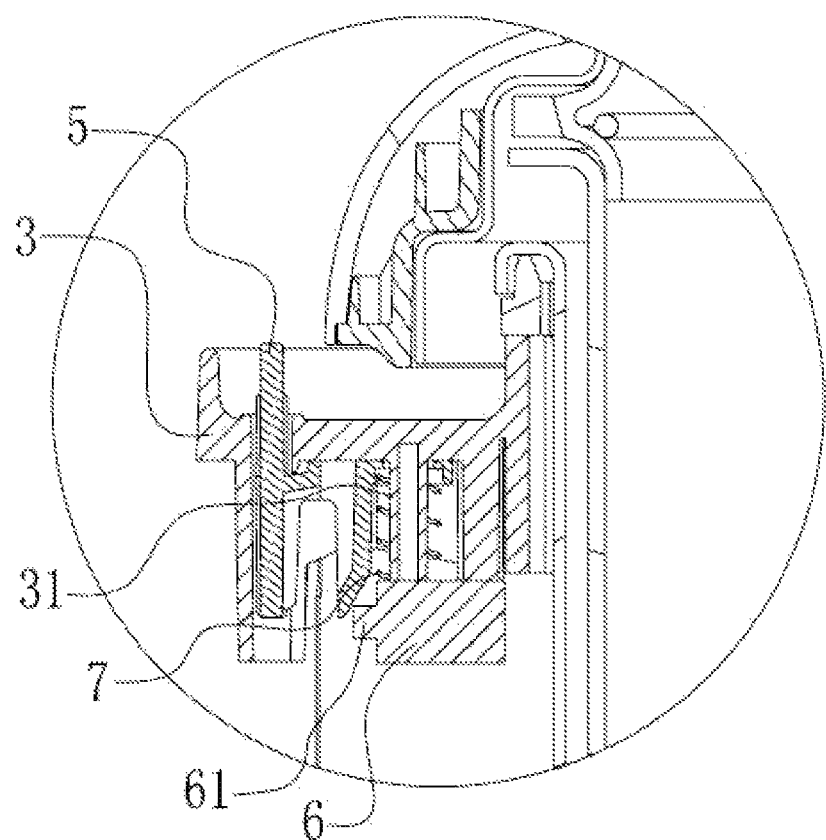
FIG. 15 is an enlarged schematic structural view of Q position in FIG. 14.

As illustrated in FIG. 13, FIG. 14 and FIG. 15, when the lid 1 is engaged with the cooker and the lid 1 is rotated in place, the push block 11 on the lid 1 is detached from the push rod 5; the push rod 5 moves to the upper limit position under the effect of the resilience force of the compression spring 7, and the suspension arm 53 of the push rod 5 is detached from the driving rod 61 of the microswitch 6 such that the microswitch 6 retains in the closing state. In this case, the electric pressure cooker is capable of heating.

Described above is only a specific exemplary embodiment of the present invention. However, the design concept of the present invention is not limited to this embodiment. Any non-substantial modifications made to the present invention based on the design concept of the present invention all fall within the protection scope of the present invention.

What is claimed is:

1. An electric pressure cooker having a safety switch device, comprising:
    a cooker body and a lid, the lid being rotatably engaged with the cooker body; wherein the cooker body is provided with a push rod vertically reciprocating relative to the cooker body, and that the cooker body is further provided with a microswitch; wherein a driving rod of the microswitch horizontally reciprocates relative to the cooker body; after the push rod moves downward, the driving rod of the microswitch is pushed to trigger the microswitch by the push rod; after the push rod moves upward, the driving rod of the microswitch is detached from the push rod and the driving rod of the microswitch is automatically reset; an upper end of the push rod abuts against the lid and the push rod moves upward and downward with rotation of the lid to detach from and push the driving rod of the microswitch; and the microswitch is electrically connected to a circuitry of the electric pressure cooker.

2. The electric pressure cooker having a safety switch device according to claim 1, wherein the microswitch is a normally-closed microswitch.

3. The electric pressure cooker having a safety switch device according to claim 1, wherein the push rod comprises a plate-shaped body, the plate-shaped body upward and downward slidingly cooperating with the cooker body, one side of the plate-shaped body being provided with a horizontal plate perpendicular to a side face of the plate-shaped body, a suspension arm whose central line is parallel to the side face of the plate-shaped body being downward provided on the horizontal plate, a lower end of the suspension arm being provided with a bevel face for driving the driving rod of the microswitch, the horizontal plate being further provided with a via hole, the cooker body being provided with a slide rod, the via hole in the horizontal plate being sleeved onto an outer side of the slide rod such that the push rod slidingly cooperates with the slide rod, a compression spring being sleeved onto the outer side of the slide rod, an upper end of the compression spring abutting against a lower face of the horizontal plate, and a lower end of the compression spring abutting against the cooker body.

4. The electric pressure cooker having a safety switch device according to claim 3, wherein the lid is provided with a push block; when the lid is rotated and engaged with the cooker body but is not in place to be properly engaged with the cooker body, the push block pushes the push rod to move downward; and when the lid is rotated and in place to be properly engaged with the cooker body, the push block is detached from the push rod and the push rod moves upward under a resilience force of the compression spring.

5. The electric pressure cooker having a safety switch device according to claim 4, wherein an upper end of the plate-shaped body of the push rod is arch-shaped or sharp.

6. The electric pressure cooker having a safety switch device according to claim 4, wherein the cooker body comprises a housing, a middle ring and an outer cooker, wherein the outer cooker is arranged in the housing, the middle ring being connected to an upper end of the housing, the slide rod being arranged on the middle ring, the push rod upward and downward slidingly cooperating with the middle ring and being not detached from the middle ring, the microswitch being mounted on the middle ring, and the microswitch being arranged between the outer cooker and the housing.

7. The electric pressure cooker having a safety switch device according to claim 6, wherein when the push rod moves upward and downward, an upper end of the plate-shaped body is always partially exposed from the middle ring.

* * * * *